United States Patent Office 3,545,953
Patented Dec. 8, 1970

3,545,953
PROCESS FOR THE PREPARATION OF SOIL IM-
PROVERS, CONTAINING Ca-HUMATE, FROM
FERMENTATION SLOPS AND PEATS, AND
PRODUCT THEREOF
Kinya Hirano and Tsuneo Sejima, Hofu-shi, Japan, assignors to Kyowa Hakko Kogyo Kabushiki Kaisha, Tokyo-to, Japan, a Japanese corporation
No Drawing. Filed Feb. 3, 1967, Ser. No. 613,745
Claims priority, application Japan, Feb. 5, 1966, 41/6,370
Int. Cl. C05f 11/02
U.S. Cl. 71—24                                7 Claims

ABSTRACT OF THE DISCLOSURE

A process for the preparation of soil improvers, containing Ca-humate, from fermentation slops and peats which comprises mixing a fermentation slop with a peat to obtain a mixture, adjusting the pH of the mixture to more than 6, adding to the mixture a calcium source in an amount of more than that which is equivalent to the cation exchange capacity of the peat used and heating the mixture at 100 to 120° C. to yield a soil improver.

FIELD OF INVENTION

The present invention is concerned with a process for the preparation of soil improvers. More particularly, the present invention is directed to a process for the preparation of soil improvers from fermentation slops and peats. The soil improvers obtained according to the invention possess a large cation exchange capacity and exhibit consistent soil-improving effects. The soil improvers possess the added advantages in that they are inexpensively produced and can be obtained in good yields.

Although various components contained in fermentation slops such as proteins, carbohydrates ammonia, minerals, etc. are observed to be useful for growing plants, the recovery of these useful components e.g. by filtration or condensation, has various disadvantages due to the low concentration of solids, which are contained in slops in both soluble and insoluble forms. In addition, dried slops have a strong hygroscopic nature, which may require hazardous operations.

Although peats have a large cation exchange capacity and have also been observed to be capable of improving soil properties, their decomposition in the soil, however, is inhibited because of their high acidic nature. Moreover, dried peats have the disadvantages of a strong hydrophobic nature, which is liable to diminish their soil-improving properties.

DESCRIPTION OF PRIOR ART

Attempts have been made to prepare soil improvers from peats by adding a lime slurry to the peat and heating the mixture to neutralize the acids contained therein. Although the limed peat thus obtained may decompose in the soil easier than the raw peat, the limed peat can give rise to the disadvantages of nitrogen deficiency when applied in large amounts to soil since the limed peats of the known types have a high, 35:1 C/N ratio. As a result, it generally requires a relatively long period of time, after application to the soil, for the achievement of soil improving effects.

SUMMARY OF INVENTION

Consequently, from the foregoing it is quite clear that a process which can produce an effective and inexpensive soil improving material free of those disadvantages which are attendant to the prior art products would constitute a valuable discovery.

Therefore, an object of the present invention is not only to provide a process for the preparation of soil improvers, but also and more specifically to provide a process which would permit the production of soil improvers having a large cation exchange capacity and consistent improving effects at lower preparation costs and in good yields.

A further object of the present invention is to provide a process for the preparation of soil improvers from fermentation slops and peats.

Other objects and features of the present invention will be clearly understood upon reading the following disclosure and claims.

The soil improvers obtained by the process of the present invention are free from the various disadvantages such as those which are customarily obtained by the conventional processes for the production of soil improvers from peats.

DETAILED DESCRIPTION OF THE INVENTION

Accordingly, the present invention provides a process for the preparation of soil improvers from fermentation slops and peats which comprises mixing a fermentation slop with a peat to obtain a mixture, adjusting the pH of the mixture to more than 6, adding to the mixture a calcium source in an amount of more than that which is equivalent to the cation exchange capacity of the peat used and heating the mixture to 100 to 120° C. to yield a soil improver.

Peats have a strong capacity for absorbing the organic substances such as mycelium, sugars, etc. as well as cations such as calcium, ammonia, potassium, magnesium which are contained in fermentation slops and therefore can serve as a good filter aid because of their capability for fixing or adsorbing insoluble fractions contained in fermentation slops.

With respect to the peats which are useful for the present invention, it is possible to use the various peats which are capable of adsorbing organic substances and cations contained in fermentation slops. The amount of the peat used depends upon various conditions such as the amounts and the properties of the solids contained in the fermentation slop, the organic substance or cation adsorbing capacity of the peat, etc. Preferably, from about 20 to 60 parts by weight of a conventional raw peat are used for about every 100 parts by weight of a conventional alcoholic fermentation slop.

Fermentation slops which may be useful for the process of the present invention include those which are obtained from conventional fermentation processes such as the fermentation of alcohols, amino acids, (e.g., glutamic acid, lysine etc.) antibiotics, vitamins, nucleic acids-relating substances etc. which contain organic substances and cations useful for growing plants.

Some of the above mentioned effective substances, such as organic substances and cations, contained in the slop can sufficiently be adsorbed on the peat even at room temperature. However, it is possible to accelerate the adsorption by treatment of the slop at elevated temperatures. The peat, on which the effective components are adsorbed, can, if desired, be separated by a suitable method such as the filtration, centrifugation, etc.

Since the peat, on which the various components are adsorbed (hereinafter designated as slop-adsorbed peat), is liable to the nitrogen deficiency at least at the early stage of the application to the soil, it should be further treated in the following manner.

To the slop-adsorbed peat is added a calcium source in an amount sufficient to give the slop-adsorbed peat a pH of more than 6 and at once to be more than equivalent to the cation exchange capacity of the peat used. It is possible to use various calcium sources for this purpose; however, it is preferred to use CaO or $CaCO_3$. Alternatively, the slop-adsorbed peat may first be adjusted to a pH of more than 6 by the addition of a suitable pH controller such as ammonia water. Then the calcium may be added in an amount of more than equivalent to the cation exchange capacity of the peat used.

By heating the mixture at 100 to 120° C., unstable components originally contained in the slop and adsorbed on the peat are converted into humus such as soluble humus. The converted humus as well as the other humus originally contained in the peat are further converted into soluble humus derivatives such as humic acid and fulvic acid, either of which may greatly contribute to increase the cation exchange capacity of the reaction product.

The combined soluble humus are then saturated with the excess calcium to form calcium salts thereof, which may decompose gradually and consistently in the soil with a steady release of inorganic nitrogen. Actually, the main advantages achieved from the present invention are found in these outstanding properties.

The aforementioned treatment of the fermentation slop and the peat is generally carried out for several hours and preferably in a closed vessel. Any reaction temperature of less than about 100° C. can give rise to the disadvantages of poor yield of soluble humus, while a reaction temperature of more than about 120° C. is liable to produce lower capacity of releasing inorganic nitrogen in the soil.

Table 1, which follows, sets forth the analytical data for the soil improver as obtained by the process according to the present invention. It is evident from the data that a remarkable increase in the cation exchange capacity is obtained from the conversion of the effective compounds contained both in the fermentation slop and peat into soluble humus such as humic acid and fulvic acid. The product designated as Sample 1 as exemplified in Table 1 was prepared by mixing 100 parts by weight of a dried peat having a cation exchange capacity of 50 m. eq./100 g. with 500 parts by weight of conventional alcoholic fermentation slops containing 7.5% of total solids. To this mixture was then added lime in such an amount that the total amount of the calcium contained in the mixture would be 2 equivalents to the cation exchange capacity of the peat used. The mixture was then stirred for 24 hours at room temperature, and finally exposed to air until dry. Samples 2–5 of the table were prepared in the same manner as Sample 1 with the exception that the respective mixtures were heated at 100°, 110°, 120° and 140° C. for 3 hours and dried at 100° C.

TABLE 1

A—Reaction temperature (° C.)
B—Nitrogen total (percent)
C—Calcium total (percent)
D—Nitrogen substituted (m. eq./100 g.)
E—Calcium substituted (m. eq./100 g.)
F—Sugar total (percent)
G—Cation exchange capacity (m. eq./100 g.)
H—pH
Blank positions—not measured

| Sample | A | B | C | D | E | F | G | H |
|---|---|---|---|---|---|---|---|---|
| 1 | Room temperature | 1.39 | 2.32 | | 45 | 2.93 | 48 | 5.5 |
| 2 | 100 | 1.34 | 2.30 | 2 | 53 | 1.11 | 60 | 5.2 |
| 3 | 110 | 1.33 | 2.31 | 2 | 54 | 0.21 | 57 | 5.2 |
| 4 | 120 | 1.47 | 2.65 | | 57 | 0.04 | 57 | 5.4 |
| 5 | 140 | 1.33 | 2.91 | | 53 | | 53 | 5.4 |

In one advantageous embodiment of the present invention, ammonia is added to the reaction product. The addition of ammonia allows a more congruous release of a higher concentration of inorganic nitrogen in the soil. The total amount of ammonia which is contained in the mixture should be no more than an equivalent to the cation exchange capacity of the peat used since an excessive amount of ammonia can give rise to diminishing soil-improving effects of the final product. The amount of ammonia either used as the pH controller or as contained originally in starting materials should be taken into account when determining the amount of ammonia which is to be added.

In the following Tables 2 and 3, soil improving effects obtained from the product according to the present inventiton (A), a similar product having added ammonia (B) and the limed peat of a conventional type (C) are compared. The samples, as exemplified in the tables, were prepared in the following manner:

(A) 100 parts by weight of a peat having a cation exchange capacity—50 m. eq./100 g. was added to 500 parts per weight of a conventional alcoholic fermentation slop having a total solids content of 7.5%. 2.8 parts, i.e. 2 equivalents to the cation exchange capacity of the peat used, of lime was added to the mixture and heated at 110° C. for 3 hours. After heating, the resulting product was dried at 100° C.

(B) This product was prepared in a manner similar to that described in (A) with the exception that only 1.4 parts of lime (i.e. an equivalent to the cation exchange capacity of the peat used) were added in addition to 3 parts of a 28% ammonia liquor.

(C) A peat similar to that as used in (A) was first mixed with 500 parts of water, then was treated with 2.8 parts of lime in a similar manner to that described in (A). No slops were used in the formation of this product.

The amount of the samples investigated, corresponds to 50 mg. of inorganic nitrogen respectively in Table 3.

TABLE 2

| Sample | N total, percent | Ammonia-N, percent | pH |
|---|---|---|---|
| A | 1.34 | 0.13 | 6.0 |
| B | 1.49 | 0.08 | 5.1 |
| C | 1.34 | 0.13 | 6.0 |

TABLE 3
(Unit-mg.)

| Sample | | Day 2 | 5 | 10 | 20 | 30 | 40 |
|---|---|---|---|---|---|---|---|
| A | $NH_3$—N | 10.64 | 11.67 | 14.77 | 15.35 | 18.76 | 17.31 |
| | $NO_3$—N | 4.12 | 3.78 | 0.81 | 0.83 | 0.58 | 3.95 |
| | Total | 13.45 | 15.45 | 15.48 | 16.13 | 19.34 | 21.76 |
| B | $NH_3$—N | 15.76 | 21.13 | 23.53 | 23.53 | 28.23 | 29.92 |
| | $NO_3$—N | 2.76 | 1.00 | 0.13 | 0.96 | 1.34 | 2.76 |
| | Total | 18.52 | 22.13 | 23.71 | 24.49 | 29.57 | 32.68 |
| C | $NH_3$—N | 6.18 | 9.23 | 11.67 | 11.32 | 14.76 | 13.81 |
| | $NO_3$—N | 3.44 | 1.58 | trace | 0.72 | trace | 3.95 |
| | Total | 9.62 | 10.31 | 11.67 | 12.04 | 14.76 | 17.76 |
| D [1] | $NH_3$—N | 2.40 | 9.95 | 12.01 | 10.64 | 13.37 | 14.60 |
| | $NO_3$—N | 5.26 | 0.86 | 1.17 | 2.54 | 2.37 | 1.97 |
| | Total | 7.66 | 10.81 | 13.18 | 13.18 | 15.55 | 16.57 |

[1] Note.—D indicates the control fraction (untreated).

From the above tables, it is apparent that the products obtained according to the present invention have far superior properties to those of the known types particularly with respect to their soil improving properties such as consistent and durable release of inorganic nitrogen in the soil. The primary reason for these advantageous characteristics is that the products contain various effective components, such as soluble humus as well as cations derived from the fermentation slop and peat. These effective components ensure the soil improving properties of the products obtained according to the present invention.

The following non-limitative examples illustrate the invention.

EXAMPLE 1

To 1,000 parts of the slop (ph 3.7; total solids—6.26%; total N—0.56%; ammonia-N—0.41%; total $K_2O$—0.32%; total CaO—0.30%) obtained from a conventional lysine fermentation, after the adsorption of lysine on the ion exchange resin, were added 60 parts of calcium carbonate to adjust the pH to 6.12, and 500 parts of a conventional dried raw peat of market grade (cation exchange capacity—65 m. eq./100 g.). The ingredients were mixed and the mixture was then fed into an autoclave with the concurrent addition thereto of 13.7 parts of calcium oxide, which corresponded to 1.5 equivalents to the cation exchange capacity of the peat used. The mixture was heated with stirring at 120° C. for 2 hours. The reaction product obtained was heated until dry. The yield was 625 parts. The analytical data of the product thus obtained are shown in the following Tables 4 and 5.

TABLE 4

Nitrogen total—1.92%
Ammonia-N—0.30%
CaO total—7.94%
CaO substituted—1.34%
$K_2O$ total—0.51%
$K_2O$ substituted—0.34%
Cation exchange capacity—79.4 m. eq./100 g.
pH—6.75

TABLE 5.—HUMUS ANALYSIS BY SIMON'S METHOD

| (1) NaOH extraction | Raw peat | Reaction product |
|---|---|---|
| Soluble humus | 1,410 | 2,940 |
| Fulvic acid | 145 | 1,53 |
| Insolubles | 1,250 | 1,41 |
| Humic acid | 215 | 840 |
| Degree of formation of humus, percent | 17.1 | 59.6 |

| (2) NaF extraction | Raw peat | Reaction product |
|---|---|---|
| Soluble humus | 172 | 1,200 |
| Fulvic acid | 44 | 930 |
| Insolubles | 100 | 240 |
| Humic acid | 79 | 210 |
| Degree of formation of humus, percent | 79 | 87.5 |

NOTE.—Figures in Table 5 indicate the consumption of $KMnO_4$ in ml. per 30 ml. of NaOH or NaF eluates respectively.

To 1,000 parts of alcoholic fermentation slops of a conventional type (pH—4.75; total solids—6.21%; total N—0.098%; ammonia-nitrogen—trace; total CaO—0.15%; total $K_2O$—0.06%) were added 8 parts of 28% ammonia liquor to adjust the pH to 6.4, and 400 parts of a dried peat (cation exchange capacity 70 m. eq./100 g.). Then, 6.5 parts of calcium oxide were added, which corresponded to 15 equivalents to the cation exchange capacity of the peat used was added to the mixture. The mixture was heated with stirring in an autoclave at 120° C. for approximately 3 hours. The reaction product thus obtained was dried at 100° C. The yield was 455 parts and the analytical data shown in the following Tables 6 and 7 were determined.

TABLE 6

Nitrogen total—3.30%
Ammonia-nitrogen—1.31%
CaO total—2.08%
CaO substituted—1.37%
$K_2O$ total—1.32%
$K_2O$ substituted—0.93%
Cation exchange capacity—81 m. eq./100 g.
pH—6.75

TABLE 7.—HUMUS ANALYSIS BY SIMON'S METHOD

| (1) NaOH extraction | Raw peat | Reaction product |
|---|---|---|
| Soluble humus | 1,540 | 3,060 |
| Fulvic acid | 144 | 1,410 |
| Insolubles | 1,390 | 2,040 |
| Humic acid | 287 | 780 |
| Degree of formation of humus, percent | 20.6 | 38.2 |

| (2) NaF extraction | Raw peat | Reaction product |
|---|---|---|
| Soluble humus | 210 | 1,230 |
| Fulvic acid | 58 | 1,005 |
| Insolubles | 150 | 300 |
| Humic acid | 83 | 255 |
| Degree of formation of humus, percent | 55 | 85 |

NOTE.—Figures indicate the consumption of $KMnO_4$ in ml. per 30 ml. of NaOH or NaF eluates respectively.

We claim:
1. A process for the preparation of a soil improver containing Ca-humate which comprises the following steps:
 (a) adding and mixing a fermentation slop containing materials from the group consisting of proteins, carbohydrates, ammonium ions and mixtures thereof with a peat;
 (b) adjusting the pH of the slop-peat mixture to more than 6 by addition of material selected from the group consisting of calcium and ammonia;
 (c) adding calcium to the slop-peat mixture in an amount equal to more than an equivalent of the cation exchange capacity of said peat;
 (d) heating the slop-peat calcium mixture at 100 to 120° C. to obtain said soil improver containing Ca-humate.

2. A process as defined in claim 1 wherein the pH of said slop-peat-calcium mixture is adjusted by the addition thereto of ammonia in an amount which is not more than that which is equivalent to the cation exchange capacity of said peat.

3. A process as defined in claim 1 wherein said peat is mixed with said fermentation slop in an amount of from about 20 to 60 parts by weight of peat per 100 parts by weight of fermentation slop.

4. A process as defined in claim 1 wherein the calcium added is in the form of CaO or $CaCO_3$.

5. A process as defined in claim 1 wherein the heating of step (d) is carried out in a closed vessel.

6. The process as defined in claim 1 wherein the addition of the calcium of step (c) serves also to produce the pH adjustment of step (b).

7. A soil improver as produced by the process of claim 1.

References Cited

UNITED STATES PATENTS

| 1,254,366 | 1/1918 | Schroeder | 71—24 |
| 3,321,296 | 5/1967 | Abbe | 71—24 |

FOREIGN PATENTS

| 366,059 | 1/1963 | Switzerland | 71—24 |

S. LEON BASHORE, Primary Examiner

A. L. CORBIN, Assistant Examiner

U.S. Cl. X.R.

47—58; 71—1, 64